United States Patent

Matthews

[11] Patent Number: 4,652,169
[45] Date of Patent: Mar. 24, 1987

[54] CONNECTING STRUCTURE FOR A HUB AND FAN BLADE

[76] Inventor: David G. Matthews, 510 N. First St., Libertyville, Ill. 60048

[21] Appl. No.: 813,471

[22] Filed: Dec. 26, 1985

[51] Int. Cl.⁴ ............................................. F16B 9/00
[52] U.S. Cl. ................................. 403/261; 403/282; 403/248; 416/244 R; 411/181
[58] Field of Search ......... 416/214 R, 244 R, DIG. 3; 411/176, 177, 179, 180, 181; 403/282, 284, 274, 248, 261, 405; 29/432

[56] References Cited

U.S. PATENT DOCUMENTS

| | | | |
|---|---|---|---|
| 1,868,764 | 7/1932 | Reed | 403/365 |
| 2,794,509 | 6/1957 | Mix | 416/214 |
| 3,209,437 | 11/1965 | Voorhies . | |
| 3,234,987 | 2/1966 | Hentzi | 29/432 |
| 3,253,631 | 5/1966 | Reusser | 29/432 |
| 3,282,315 | 11/1966 | Zahodiakin . | |
| 3,282,317 | 2/1965 | Zahodiakin . | |
| 3,431,960 | 3/1969 | Neuschotz | 411/181 X |
| 3,724,520 | 4/1973 | Ladouceur et al. | 29/432 |
| 3,810,291 | 5/1974 | Ladouceur et al. | 29/432 |
| 3,878,599 | 4/1975 | Ladouceur et al. . | |
| 3,960,637 | 7/1976 | Ostrow . | |
| 4,099,323 | 7/1978 | Bouvier . | |
| 4,188,800 | 2/1980 | Fujita et al. | 403/284 X |
| 4,245,960 | 1/1981 | Matthews | 416/214 R |
| 4,436,495 | 3/1984 | McCullough . | |
| 4,468,161 | 8/1981 | Krueger | 411/181 X |

FOREIGN PATENT DOCUMENTS

| | | | |
|---|---|---|---|
| 830385 | 3/1960 | United Kingdom | 416/214 |
| 1539373 | 1/1979 | United Kingdom | 403/274 |

Primary Examiner—Cornelius J. Husar
Assistant Examiner—Joseph A. Fischetti
Attorney, Agent, or Firm—Hill, Van Santen, Steadman & Simpson

[57] ABSTRACT

A structure, which interlocks a relatively thin sheet of material with a relatively heavy member, for example, a hub member with a sheet metal fan structure, comprises the hub on one end having a groove dividing the hub into an inner sleeve-like shoulder having a length substantially greater than the thickness of the sheet-like member, the groove has a wider base than the throat adjacent a second outwardly extending shoulder on which the member rests. The sleeve is cut into a plurality of segments with alternate segments being deformed to force a portion of the edge of the sheet-like member into the groove to form a spline connection with the hub.

5 Claims, 8 Drawing Figures

U.S. Patent  Mar. 24, 1987  4,652,169
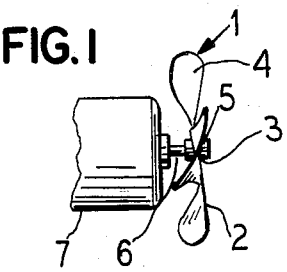
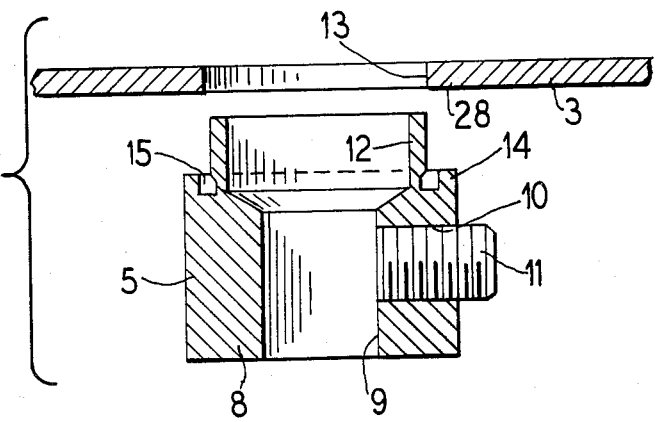
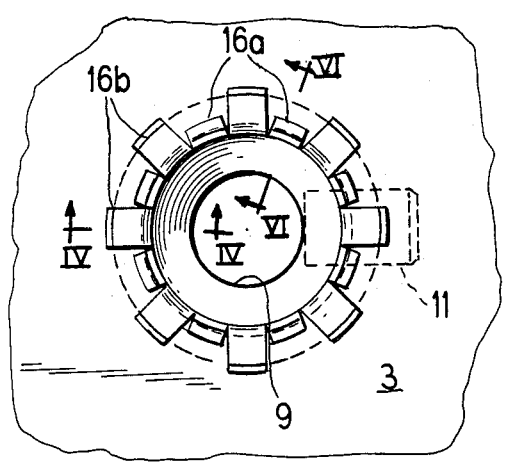
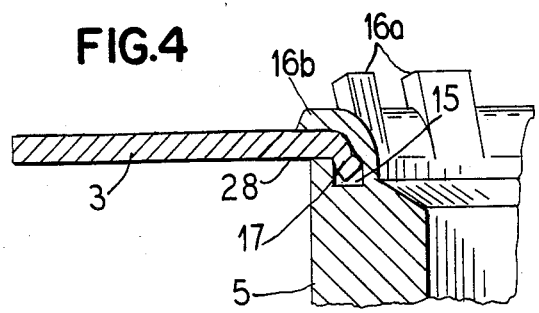
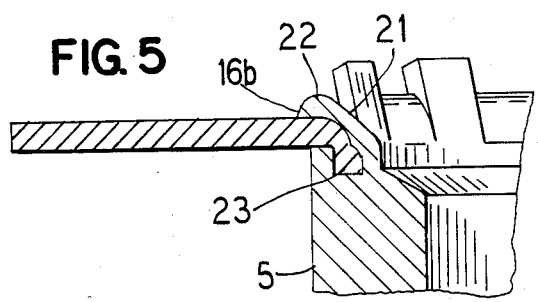
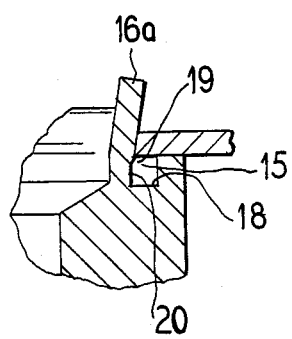
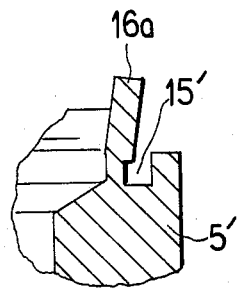
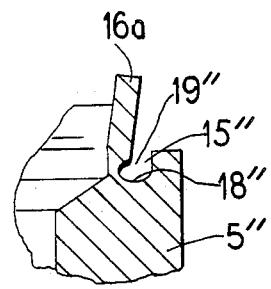

CONNECTING STRUCTURE FOR A HUB AND FAN BLADE

BACKGROUND OF THE INVENTION

The present invention relates to an arrangement for effecting a very rigid connection between relatively thin sheet metal and a heavy member. A typical example of such a structure is the connection between fan blade members and the like with a central hub member by which the blade member is adapted to be connected to a rotating drive shaft or the like. Other examples of this type of structure are for bushings, sleeves and various types of fasteners.

As disclosed in my U.S. Pat. No. 4,245,960, problems with providing an interlocking structure between a relatively thin sheet of material with a relatively heavy member exist particularly when interconnecting a sheet metal fan blade member to a hub. As disclosed in this patent, a good structure for interlocking the sheet metal fan blade member to the hub included placing the sheet metal member on the hub which had a groove and an upstanding coaxial sleeve which snugly fits in the bore of the sheet metal blade member. Then with a suitable tool, a plurality of shear cuts are formed in the free end of the sleeve to divide the same into a plurality of axially extending segments with every other segment being crimped down to force a portion of the edge of the aperture into the groove. This provides an interlocking structure, which would transmit torque between the hub and the fan blade member. If the connecting line were not a circular groove but a linear groove, then the alternate deforming of the segments would prevent sliding motion along the connecting line between the sheet metal member and the heavier member.

SUMMARY OF THE INVENTION

The present invention is directed to providing an improved interlocking connection between the sheet member and a heavier member such as between a sheet metal fan blade member and a hub.

To accomplish these goals, the present invention is directed to a structure for connecting two members at a line of connection, a first of said two members being in the form of relatively thin sheet-like formation at the line of connection and having an abutting edge, the second of said two members being relatively heavier in the direction transverse to the sheet-like formation of the first member, said second member having a groove therein extending along the line of connection, said groove having a wider base than throat with the throat being approximately equal to the thickness of the sheet-like formation of the first member and forming two spaced upstanding shoulders, one of said two shoulders extending beyond the other shoulder by a dimension greater than the thickness of said first member, said one shoulder being divided into a plurality of segments with alternate segments being in one group and intermediate segments being in a second group, said first member being seated on an upper edge of the other shoulder with said abutting edges in contact against the segments of the one shoulder, each of the intermediate segments having a free end extending beyond the abutting edge and being deformed toward and into engagement with the first member, said first member at each point of engagement with the intermediate segment having a portion extending into the groove and into the wide base portion of the groove to prevent relative movement along the line of connection.

Preferably, the connection is between a sheet metal member having an aperture and a hub member with the one shoulder being an axially extending sleeve of the hub and the abutting surface of the sheet metal member being an edge of an aperture receiving the sleeve. If desired, the deformed intermediate segments can be deformed further by applying pressure at points on a portion of the segment so as to further extrude the edge of the abutting surface into the enlarged or wide base portion of the groove. Preferably, the enlarged portion of an annular groove extends radially inwardly and the groove can have various cross-sectional shapes.

BRIEF DESCRIPTION OF THE DRAWINGS

FIG. 1 is a side elevational view of a fan blade structure mounted on a motor-driven shaft;

FIG. 2 is an enlarged axial cross-sectional view of a hub member and a portion of the cooperable blade member prior to assembly;

FIG. 3 is a top plan view of a completed assembly in accordance with the present invention;

FIG. 4 is a partial cross-sectional view taken on lines IV—IV of FIG. 3;

FIG. 5 is a partial cross-sectional view similar to FIG. 4 illustrating the connection with further pressing;

FIG. 6 is a cross-sectional view taken on lines VI—VI of FIG. 3;

FIG. 7 is a partial cross-sectional view similar to FIG. 5 without the blade member showing a modification in the cross-section of the groove; and FIG. 8 is a cross-sectional view similar to FIG. 7 showing a further modification of the groove.

DESCRIPTION OF THE PREFERRED EMBODIMENTS

The principles of the present invention are particularly useful for forming an interlocking connection in a fan blade structure generally indicated at 1 between a blade member 2 having a central portion 3 from which extends a plurality of blades 4. The central portion 3 is connected to a hub member 5 which enables the blade structure 1 to be mounted on a drive shaft 6 of a motor 7.

A large number of blades of this type are constructed from sheet metal suitably configured and bent to form the blade member 2 which is secured in a separately formed hub 5. Referring more to FIGS. 2 through 6, the hub member 5 is provided with a cylindrical tubular body portion 8 having a central bore 9 adapted to receive a drive shaft of a motor or other driving means with the body portion 8 having a relatively thick wall with a threaded bore 10 which receives a set screw 11. The set screw 11 enables locking the hub onto the shaft which is inserted into the bore 9.

Integrally formed with the body portion 8 and extending in an axial direction from one end of the latter is a coaxial sleeve 12 which is relatively thin in a radial thickness as compared with the corresponding thickness of the body portion 8. The outer diameter of the sleeve 12 is approximately equal to the diameter of a bore 13 in a central portion 3 of the blade member 2 so that the sleeve 12 may be readily inserted into the bore 13 and fit snugly therein. The body member 8 is also provided with an annular shoulder 14 disposed adjacent the inner end of the sleeve 12 and spaced therefrom by an annular groove 15 having a radial thickness which is approximately equal to the thickness of the central portion 3 of the blade member.

As disclosed in the above-mentioned U.S. Pat. No. 4,245,960, whose disclosure is incorporated herein by reference thereto, the sleeve 12 of the hub member is inserted into the bore 13 with the bottom surface 28 of the central portion 3 as illustrated in FIG. 2 resting or seated on the shoulder 14. Then with a suitable tool, a plurality of shear cuts formed in the free end of the sleeve 12 to divide the same into a plurality of axially extending segments 16a and 16b (FIG. 4). The alternate segment 16a are deformed slightly to provide a flared configuration as illustrated in FIG. 6 whereby the outer surface of each segment 16a is brought into firm engagement with a peripheral edge of the bore 13 but insufficient to materially deform the peripheral portion of the blade member. The intermediate segments 16b, however, are bent to a considerable greater extent than the alternate segment 16a so that the intermediate segments are bent over to engage the adjacent upper face of the central portion of the blade member as viewed in FIG. 4.

As previously mentioned, the blade member 2 is formed from a relatively soft material while the hub member 5 is formed from a relatively harder material so that upon bending over the segment 16b, a portion of the member 3 is sheared from the latter along the side edges of the segment and flows into the groove 15 as indicated by portions 17 in FIG. 4. The amount of flow depends on the pressure applied to an upper surface of each segment 16b.

As illustrated in FIGS. 5 and 6, the groove 15 has an enlarged width at its base 18 which is wider than the throat or mouth 19 adjacent the shoulder 14. In the illustrated embodiment of FIG. 6, it is noted that the increased width from an undercut 20 of a portion of the sleeve having the segments 16a and 16b.

While the deforming of the segments 16b causes a portion 17 to flow into the groove 15, applying additional pressure on surfaces 21 or 22 (FIG. 5) extrudes or causes more material to flow into the groove 15. This greater flow is illustrated at 23 in FIG. 5 and causes a filling of the groove adjacent each segment 16b which has been subjected to this additional pressure. The additional pressure can be created by either a second pressing of the assembly of FIG. 4 or by providing pressure surfaces or projections on the tool which is used to deform the segments 16b into the deformed condition.

As illustrated in FIG. 6, the segment 16a, which is not deformed to any great extent, does not cause the edge portion to be deformed into the groove 15. Thus, the deforming of the segment 16b relative to the segment 16a causes a splined connection between the blade member 2 and hub member 5 which is very durable, particularly due to the increased width of the groove 15 adjacent the bottom 18. Thus, the material flowing into the groove forms an interlocking enlargement to improve the interlocking connection between the sheet metal member and hub.

To form the groove 15, as best illustrated in FIGS. 2 and 6, the hub can have the groove undercut by means of a tool. As illustrated, the groove has an undercut 20 which gives it a cross-section of a five-sided configuration. Instead of an undercut configuration of FIGS. 2 and 6, a hub 5' can have a groove 15' which has an L-shaped configuration. Another modification is illustrated by the hub 5" of FIG. 8 which has a groove 15" which has a circular base or round configuration 18" with a throat 19". In each instance, the groove has an undercut portion to form an enlarged base to provide interlocking of the member to the hub.

While the invention has been described with regard to connecting a sheet metal member to a hub, it also can be used to connect an edge of a sheet member in a groove of a larger member whether the groove is either an annular groove or a straight linear groove. In each instance, the deforming of the segments of a shoulder or sleeve cause alternate portions of the abutting edge of the sheet member to flow into the groove having the enlarged or wider base to provide an interlock connection or a spline connection which will transfer motion along the groove and prevent disengagement. If the groove is annular, the connection is good for transferring torque.

Although various minor modifications may be suggested by those versed in the art, it should be understood that I wish to embody within the scope of the patent granted hereon, all such modifications as reasonably and properly come within the scope of my contribution to the art.

I claim:

1. A structure for connecting two members at a line of connection, a first of said two members being in the form of relatively thin sheet-like formation at the line of connection and having an abutting edge, the second of said two members being relatively heavier in a direction transverse to the sheet-like formation of the first member, said second member having a groove therein extending along the line of connection, said groove having a width approximately equal to the thickness of said sheet-like formation of the first member and forming two spaced upstanding shoulders, one of said two shoulders extending beyond the other shoulder by a dimension greater than the thickness of said first member, said groove having a throat extending to a base with the width of the groove at the base being greater than the width adjacent the throat to form an under cut of said one shoulder, said one shoulder being divided into a plurality of segments with alternate segments being in one group and intermediate segments being in a second group, said first member being seated on the upper edge of the other shoulder with said abutting edge in contact with the segments of the one shoulder, each of the intermediate segments having free ends extending beyond the abutting edge and being deformed toward and into engagement with the first member, said first member at each point of engagement with the intermediate segments having a portion extending into the groove to prevent relative movement.

2. A structure according to claim 1, wherein the alternate segments extend outwardly beyond said abutting edge and are flared laterally toward said abutting edge.

3. A structure according to claim 1, wherein said groove has a depth approximately equal to the thickness of said sheet-like formation with an undercut extending beneath a portion of said one shoulder.

4. A structure according to claim 1, wherein said second member is an annular member, said groove is an annular groove, said one shoulder being a sleeve-shaped member extending axially from the hub and said wider portion extends radially inwardly to undercut a portion of said sleeve.

5. A structure according to claim 4, wherein the intermediate segments have been further deformed to cause the edge of the sheet metal member adjacent each intermediate segment to flow into the groove to substantially fill the wider portion thereof.

* * * * *